(No Model.)

T. J. MURRAY.
MINER'S IMPLEMENT.

No. 565,497.    Patented Aug. 11, 1896.

WITNESSES:

INVENTOR
Thomas J. Murray,
BY Edgar Tate & Co
ATTORNEYS.

UNITED STATES PATENT OFFICE.

THOMAS JEFFERSON MURRAY, OF GRUBGULCH, CALIFORNIA.

MINER'S IMPLEMENT.

SPECIFICATION forming part of Letters Patent No. 565,497, dated August 11, 1896.

Application filed October 31, 1895. Serial No. 567,543. (No model.)

*To all whom it may concern:*

Be it known that I, THOMAS JEFFERSON MURRAY, a citizen of the United States, and a resident of Grubgulch, in the county of Madera and State of California, have invented certain new and useful Improvements in Miners' Implements, of which the following is a specification, reference being had to the accompanying drawings, forming a part thereof, in which similar letters of reference indicate corresponding parts.

This invention relates to miners' implements, and the object thereof is to provide a combined candlestick, fuse-cutter, cap-crimper, and powder-knife with a holder or attaching device connected therewith, a further object being to provide such a device the separate parts of which may be folded compactly, so that it can be easily carried in the pocket.

The invention is fully disclosed in the following specification, of which the accompanying drawings form a part, in which—

Figure 1:
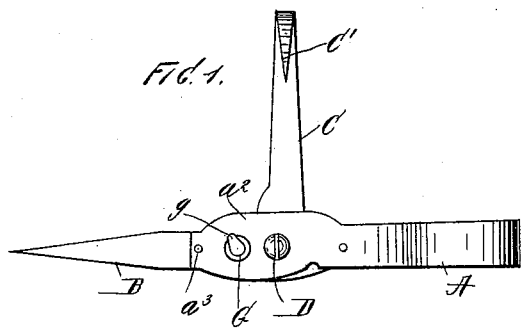
Figure 2:
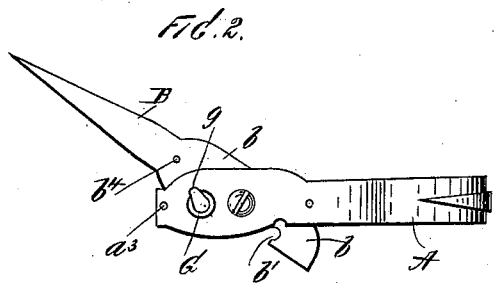
Figure 3:
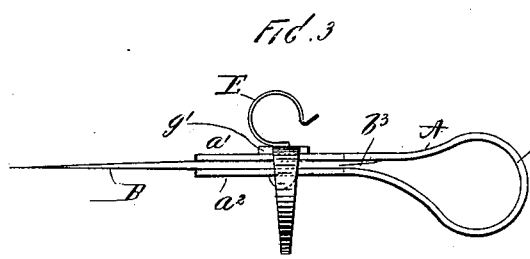

Figure 1 is a side view of my improved miner's implement, showing the powder-knife and the attaching or suspending device open; Fig. 2, a similar view showing the suspending device folded and the powder knife or blade partly open; Fig. 3, a plan view of the device as shown in Fig. 1; and Fig. 4, a view similar to that of Fig. 2, showing the powder knife or blade in a different position.

In the practice of my invention I provide a handle A, which is preferably composed of a plate of strong spring-steel, folded as shown in Fig. 3, so as to form a loop $a$ and side jaws $a'$ and $a^2$, between which the powder knife or blade B is pivoted by means of a screw or rivet D. The attaching or suspending device C is also formed of a plate of spring-steel, and the base thereof is pivotally connected with the outer side of the jaw $a'$ and the free end thereof is pointed and bent to form a hook, as shown at C', and said hook is adapted to be folded around the handle A, as shown in Figs. 2 and 4, and secured to the base of the attaching device C is a candle-holder E, which is composed of a ring of spring metal bent at one side so as to give it elasticity.

The candle-holder E is tubular in form, and when the implement is held in the position shown in Figs. 1 and 3, with the attaching or suspending device open, the arrangement of the candle-holder will be such as to hold the candle in a vertical position and at right angles to the handle, as will be readily understood.

Figure 4:
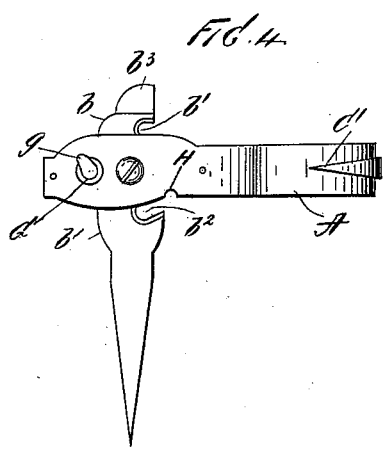

The powder knife or blade B is provided with a shank $b$, the back of which is slightly curved, and the front of which, opposite the pointed end, is provided with an inwardly-directed cavity or recess $b'$, the sides of which are provided with cutting edges, and formed in the front of said shank, adjacent to the blade, is a similar inwardly-directed cavity or recess $b^2$, the sides of which are also provided with cutting edges, and on the end of the shank $b$ is formed a short blade $b^3$, the convex portion of which, as shown in Fig. 4, is provided with a sharp cutting edge.

Formed also in the powder knife or blade B, at the end thereof or in the end of the shank $b$, is a cavity or depression $b^4$, adapted to receive a pin or lug $a^3$, which projects inwardly from the inner side of the jaw $a^2$, and the object of this arrangement is to hold the powder knife or blade open or in the open position, as shown in Figs. 1 and 3. Formed also in the jaw $a^2$ is a circular opening G, provided at one side with an oblong extension $g$, and the operation will be readily understood from the foregoing description, when taken in connection with the accompanying drawings.

The implement, as will be readily understood, may be closed up or folded, so as to be carried in the pocket, and whenever desired the powder knife or blade B may be extended, as shown in Fig. 1, so that the same may be used or the implement may be connected with a timber or other support by inserting the blade thereof thereinto, and, as will be readily understood, the suspending device or attachment C may also be used to suspend the implement from a cross-timber or other support, and, as will be also apparent, the implement may be used for a candle-holder, the latter to be inserted within the circular spring-band E and supported in either of the ways above set out.

Formed on the back of the jaw $a'$ is a small lug $g'$, against which the suspending or attaching device C strikes when in the open position, and, as will be understood, either the pointed blade B or said suspending or attaching device may be used to connect the implement with a support of any kind or class.

In order to use the implement as a cap-crimper, the blade B is turned slightly, as shown in Fig. 2, and the cap or detonator, which has previously been slipped over the fuse, as will be understood by those familiar with mining, is placed in the hole or opening G and the blade is folded almost into the handle, which movement will force the cap into the longitudinal extension $g$ of said opening, and the side walls of the cavity or recess $b^2$ will encircle or close over the cap and complete the operation of crimping, and the rounded portion of the blade is given an eccentric motion, so as to force the cap into the recess very gradually and firmly.

In order to use the implement as a fuse-cutter, the blade B is turned into the position shown in Fig. 4, and the fuse is slipped into the cavity or recess $b^2$, when by closing the blade the fuse will be cut, as will be readily understood, and the blade will press the piece of fuse cut off into the semicircular cavity or recess H, formed in the adjacent side of the handle, and hold the same from falling until released, and the blade B, as will be apparent, may be used in any desired position to split or divide the powder, and it will thus be seen that I provide an effective device for the purposes herein set out which is simple in construction and operation and perfectly adapted to accomplish the result for which it is intended.

The walls of the circular opening G are beveled, as are also those of the slots or recesses $b'$ and $b^2$, and either of the slots $b'$ and $b^2$ may be used for crimping a cap, as hereinbefore described.

My invention is not limited to the exact form, construction, and arrangement of parts shown and described, and I therefore reserve the right to make all such alterations therein and modifications thereof as fairly come within the scope of the invention.

Having fully described my invention, I claim and desire to secure by Letters Patent—

1. A miner's implement, comprising a handle, between the jaws of which is pivoted a blade, said handle being composed of a plate or strip of metal, bent to form a loop which comprises the handle, the ends of which comprise the jaws, one of said jaws being provided with a circular opening formed therein, at one side of which is an oblong extension, and the back of the shank of the blade being rounded, and the front of said shank being provided with an inclined recess or cavity, substantially as shown and described.

2. A miner's implement, comprising a handle, which is composed of a plate or strip of spring metal, bent to form a loop, which comprises the handle, and the ends of which form the jaws, a pointed blade pivoted to said jaws, one of said jaws near the end thereof, being provided with a circular opening at one side of which is formed an oblong extension, and the shank of the blade being provided near each end with notches or recesses, one of said notches or recesses being adapted to operate in connection with the opening in the jaw, to crimp a fuse-cap, substantially as shown and described.

3. A miner's implement, comprising a handle composed of a strip or plate of metal, bent to form a loop, and the ends of which form the jaws of the handle, a pointed blade pivoted between said jaws, an attaching or suspending device pivoted to one of said jaws, and provided with a curved and pointed end, a candle stick or holder, secured to the base of said attaching or suspending device, said parts being adapted to be folded together, and one of the jaws of the handle, and the shank of the blade being provided with notches or recesses, whereby the same are adapted to serve as a fuse-cutter, and the end of the shank of the blade being also provided with a short cutting-blade, substantially as shown and described.

In testimony that I claim the foregoing as my invention I have signed my name, in presence of the subscribing witnesses, this 19th day of October, 1895.

THOMAS JEFFERSON MURRAY.

Witnesses:
ADA BARRY SMITH,
ALBERT TAYLOR.